3,108,947
PROCESS FOR THE SELECTIVE HYDROGENATION OF DIENE-CONTAINING GASOLINE
Gerardus J. F. Stijntjes, Amsterdam, Netherlands, assignor to Shell Oil Company, New York, N.Y., a corporation of Delaware
No Drawing. Filed Nov. 7, 1960, Ser. No. 67,475
Claims priority, application Netherlands Nov. 26, 1959
3 Claims. (Cl. 208—144)

This invention relates to a process for the selective hydrogenation of diene-containing gasoline.

Products from the severe cracking of hydrocarbon oils ordinarily contain sulfur compounds and considerable quantities of gum-forming dienes. Dienes in gasoline have a pronounced tendency to polymerize, particularly under the influence of air and light, to form gummy materials which deposit upon feed lines, carburetors, valves and the like when the fuel containing them is used in internal combustion engines and thus interferes with the proper operation thereof. Removal of the dienes by ordinary chemical and clay treating processes usually results in large losses of valuable antiknock fuel ingredients. Removal of the gum-forming dienes by polymerization even under optimum conditions tends to result in volumetric losses up to about 20%. Therefore, a preferred method of securing stabilization of a cracked product is one wherein the diolefins are selectively hydrogenated without subtantial loss of fuel ingredients.

The selective hydrogenation of gasolines obtained by cracking petroleum residues is known from Mattox, U.S. Patent 2,742,518, issued April 17, 1956. In the process disclosed therein dienes and/or alkynes are partially hydrogenated at an elevated temperature by hydrogen transfer from naphthenic components over a suitable catalyst. Under the hydrogen transfer conditions hydrogen required for the hydrogenation is obtained from naphthenic components which are contained in the gasoline itself or, if deficient in such components, from naphthenic hydrocarbons which are added. With chromite-containing catalysts an operating temperature between approximately 200° C. and 340° C. is required, whereas with chromia-containing catalysts even higher temperatures are required.

The disadvantage of this known process is that the hydrogenation of the alkadienes and alkynes present in the cracked gasoline is carried out at a relatively high temperature. This high reaction temperature is essential because at temperatures below 200° C. naphthenes do not split off hydrogen when chromite catalysts are used. Under the hydrogen transfer conditions, however, the selectivity with respect to the hydrogenation of the dienes and alkynes is adversely affected, i.e. some of the alkenes already present or formed will also be hydrogenated. As a result, not only will the consumption of hydrogen be higher, but the product obtained is less valuable for use as a motor fuel, since the saturated hydrocarbons formed have a lower octane number than the corresponding alkenes. Moreover, at these high temperatures it is inevitable for polymerization and condensation products to be formed to a large extent, both by the reaction of alkadienes with alkynes and by the reaction of these compounds with alkenes. This results in a lower yield of refined product. In addition, the polymerization and condensation products tend to deposit on the catalyst, thereby completely or partly deactivating the latter.

An object of this invention is to provide an improved method of treating unstable gasolines which are difficult to refine by ordinary chemical and clay treating processes without incurring large losses of valuable antiknock fuel ingredients. A further object of this invention is to provide an improved method for improving the stability of a diene-containing gasoline by an improved selective hydrogenation treatment. More particularly, the object of this invention is to provide a process for improving the stability of diene-containing gasoline by a low temperature catalytic selective hydrogenation treatment.

It has now been found that gasolines containing alkadienes and alkynes and particularly those gasolines containing little or no naphthenic components can be selectively hydrogenated in the presence of free hydrogen at a temperature of not more than 150° C. over a catalyst containing chromium oxide.

The present process is particularly suitable for the treatment of gasoline or fractions thereof obtained by thermally cracking in the presence of steam a hydrocarbon oil with a final boiling point of not more than approximately 250° C. These gasolines are extremely unstable owing to the presence of a relatively high content of highly unsaturated hydrocarbons. However, these gasolines have a very high octane rating owing to the high percentage of aromatic compounds and alkenes which are in themselves stable motor gasoline components.

The highly unstable steam-cracked gasolines are produced by thermally cracking at a high temperature in the presence of steam a hydrocarbon oil and preferably a hydrocarbon oil relatively rich in aliphatic hydrocarbons. Cracking in the presence of steam is usually effected at temperatures between approximately 550° C. and 900° C., preferably between 750° C. and 800° C., and generally under a pressure below approximately 5 atm. abs. The quantity of steam employed is usually 0.1–10 parts by weight, preferably about 1 part by weight per part by weight of starting material. Cracking in the presence of steam is mainly applied for the preparation of lower alkenes, in particular ethene and propene, which are used as starting materials in the chemical industry. During the cracking treatment, which is generally carried out in a pipe still, usually more than 50% by weight of the starting hydrocarbon oil is converted into compounds having four or fewer carbon atoms in the molecule. The by-product formed during the cracking in the presence of steam is the gasoline which is refined by the process of the present invention and which usually contains more than 30% by weight and often more than 60% by weight of aromatic compounds and has a considerable content of alkenes with a relatively high octane number. In addition, a relatively large amount of highly reactive compounds, mainly dienes, inter alia, those of the cyclopentadiene type, are present. It is also of advantage that in most cases these gasolines are practically free of sulfur, i.e. they have a content of sulfur compounds (calculated as elemental sulfur) which is considerably lower than 0.1% by weight. These gasolines usually contain little or no naphthenic hydrocarbons.

The process of the present invention enables the unstable compounds present in such gasolines to be converted into more saturated compounds by means of selective hydrogenation, whereas the valuable alkenes are hardly, if at all, affected. The process of the invention is also suitable for use with other diene-containing gasolines such as those produced from high temperature short contact catalytic or thermal cracking of gas oil fractions. The diene content of such gasolines, while appreciable, is usually less than that of steam-cracked fractions. Moreover, the process of the invention is suitable for lower boiling hydrocarbons such as a $C_3$ fraction containing diolefins such as methylacetylene and propadiene. Such low boiling fractions may be treated per se or combined with diolefin-containing gasolines in the process of the invention.

The selective conversion in the process of the invention is obtained by carrying out the hydrogenation in the presence of a catalyst containing chromium oxide at a temperature of not more than 150° C. The treatment is preferably carried out at temperatures between 70° C. and 130° C.

To ensure satisfactory hydrogenation a quantity of hydrogen is employed which is at least equal to the theoretical amount required for the complete conversion of the reactive compounds present in the gasoline into more stable compounds, such as the conversion of dienes into the corresponding alkene. In order to maintain the activity of the catalyst over longer periods, however, it is preferred to use 2–5 times the theoretical amount of hydrogen.

The gas employed may be hydrogen or a hydrogen-containing gas mixture, for example a mixture of hydrogen and light hydrocarbons. When using an excess of hydrogen it is of advantage to recycle the hydrogen used, preferably after the previous removal of undesired components such as hydrogen sulfide formed during the hydrogenation. The gases employed should preferably contain more than 60% by volume of hydrogen. Very suitable are, for example, the hydrogen-containing gases obtained in the catalytic reforming of gasoline fractions.

The liquid hourly space velocity is usually 0.5–5 kg. and preferably 1–3 kg. of gasoline per hour per liter of catalyst. The gas/gasoline ratio is usually between 50 and 300 liters (standard temperature and pressure) of gas per kg. gasoline.

Although according to the present process the catalysts can be used in a fluidized or suspended state, a fixed bed of catalyst is preferably used. Since, as a result of the low hydrogenation temperatures, it is possible for the hydrocarbon oils to be present during the hydrogenation at least partly, i.e. as to more than 50% by weight and preferably as to more than 75% by weight, in the liquid phase without the need for excessively high pressures, the "trickle" technique is particularly suitable for this purpose. According to this technique which is described in Hoog, U.S. 2,608,521 (issued August 26, 1952), the starting hydrocarbon oil which is present partly in the liquid phase and partly in the vapor phase, is allowed to flow downward in the presence of hydrogen or of a hydrogen-containing gas over a catalyst in the form of a fixed bed, the unvaporized part of the starting material flowing over the catalyst particles in the form of a thin layer.

In the process of the invention wherein temperature is not more than 150° C., hydrogenation in the liquid phase usually proceeds at pressures between 10 and 60 atm. abs., preferably between 20 and 40 atm. abs. Because of the exothermic nature of the hydrogenating reactions there may be a certain increase in temperature in the catalyst bed. Therefore, it is of particular advantage to operate in the liquid phase, since because of the higher specific heat of the liquid there will generally be smaller rises in temperature than when operating in the gaseous phase.

Catalysts preferred for use in the present process are those catalysts containing chromium oxide. Particularly suitable catalysts are those which in addition to chromium oxide contain one or more elements of group I to IV of the periodic table, which elements may be present in the metallic state and/or in the form of one or more compounds with each other and/or with one or more other elements such as chromium, oxygen and/or sulfur. Particularly suitable elements are zinc, tin, magnesium, copper, barium and silicon. Catalysts in which a copper compound is present in addition to chromium oxide are especially preferred. Very good results are obtained with a catalyst containing copper oxide and chromium oxide, the atom ratio of copper to chromium being between 1:5 and 3:1 and preferably between 1:2 and 2:1. The catalysts can be supported on a carrier, and, if desired, stabilizers can be used also.

It is also of advantage to treat the catalysts with hydrogen before use. This treatment may be effected by passing hydrogen or a gas containing hydrogen over the catalyst for some hours at a temperature of, for example, approximately 200° C.

After selective hydrogenation according to the present invention, the gasoline is particularly stable and can be used as motor fuel as such or as a component fraction thereof. It will be understood that the refined gasoline or fractions thereof may also be blended with other hydrocarbon oil distillates.

The following example illustrates a preferred specific embodiment of the present invention.

*Example*

The starting material used was a gasoline obtained as a by-product in the preparation of ethene and propene by cracking in the presence of steam a straight-run hydrocarbon oil having a final boiling point of 230° C. This gasoline was free of naphthenic hydrocarbons and contained 11% by weight of dienes, 10% by weight of alkenes, about 36% by weight of aromatic hydrocarbons and about 43% by weight saturated hydrocarbons. The sulfur content was less than 0.01% by weight. Because of the high diene content, the gasoline was very unstable, as shown by an induction period of only 9 minutes without the addition of an inhibitor.

Other properties of the gasoline were: boiling range 41–180° C. (A.S.T.M.); induction period, after adding 500 p.p.m. of a phenolic inhibitor, of 255 minutes; McIlhiney number 54 g./100 g.; and an Ellis and Jones maleic acid anhydride number of 90 mg.

The gasoline, substantially in a liquid state and in the presence of 180 liters of hydrogen per kg. of starting gasoline, was passed over a copper chromite catalyst at an average catalyst temperature of 100° C., a pressure of 30 atm. abs. and a liquid hourly space velocity of 2 kg. per hour per liter.

The catalyst, containing copper and chromium in an atom ratio of 1:1.5, was pretreated by passing hydrogen over it in an amount of 1,000 liters of gas per hour per liter of catalyst for 4 hours at 200° C. under atmospheric pressure.

The treated gasoline had a diene content of less than 0.1% by weight, a bromine number of 33 g./100 g., a maleic acid anhydride number of 0.6 mg./gram and, with no inhibitor added, an induction period of more than 1,000 minutes. The octane number of the gasoline, after the addition of 1½ cc. of tetraethyl lead per U.S. gallon and determined according to the A.S.T.M. method D 908–58, was reduced only slightly from 99.3 to 98.8 as a result of hydrogen treatment, whereas the octane number of the gasoline determined according to the A.S.T.M. method D 357–58 rose from 84.7 to 86.4 also after the addition of 1½ cc. of tetraethyl lead per U.S. gallon.

I claim as my invention:

1. A process for the selective hydrogenation of steam-cracked gas gasoline which comprises contacting said gasoline with a gas containing hydrogen and no oxygen in the presence of a catalyst consisting essentially of chromium oxide and copper oxide, the atom ratio of copper to chromium being from about 1:5 to about 3:1, at a temperature of about 70° to about 130° C., a gas to gasoline ratio of 50 to 300 liters of gas per kilogram of gasoline, and a space velocity of about 0.5 to about 5 kilograms of gasoline per hour per liter of catalyst, alkadienes in said gasoline being hydrogenated thereby to alkenes without substantial hydrogenation of alkenes to alkanes.

2. A process for the selective hydrogenation of diene-containing gasolines obtained by cracking petroleum oil which comprises contacting said gasoline with a gas containing at least 60% by volume hydrogen and no free oxygen in the presence of a catalyst at a temperature in the range of about 70° to about 130° C. whereby alkadienes are hydrogenated to alkenes without substantial hydrogenation of alkenes to alkanes, said catalyst consisting essentially of chromium oxide and copper oxide and the gas to gasoline ratio being about 50 to about 300 liters of gas per kilogram of gasoline.

3. A process according to claim 2 wherein the atom ratio of copper to chromium in the catalyst is about 1:5 to about 3:1.

References Cited in the file of this patent

UNITED STATES PATENTS

| | | |
|---|---|---|
| 1,889,388 | Smith | Nov. 29, 1932 |
| 2,332,572 | Hepp et al. | Oct. 26, 1943 |
| 2,336,736 | Kanhofer | Dec. 14, 1943 |
| 2,742,518 | Mattox | Apr. 17, 1956 |

OTHER REFERENCES

Berkman et al.: "Catalysis," 1940, Reinhold Publishing Corp., New York, N.Y., page 276 and page 664, column 2, under Olefins, Hydrogenation, lines 5 and 8.